United States Patent
Caron et al.

(10) Patent No.: US 9,114,419 B2
(45) Date of Patent: Aug. 25, 2015

(54) METHOD FOR HOLDING A LENS FOR DIP TREATMENT THEREOF

(75) Inventors: Pierre Caron, Charenton (FR); Annette Cretier, Charenton (FR); Annick Gascons, Charenton (FR)

(73) Assignee: ESSILOR INTERNATIONAL (COMPAGNIE GENERALE D'OPTIQUE), Charenton (FR)

( * ) Notice: Subject to any disclaimer, the term of this patent is extended or adjusted under 35 U.S.C. 154(b) by 991 days.

(21) Appl. No.: 12/956,257

(22) Filed: Nov. 30, 2010

(65) Prior Publication Data

US 2011/0070364 A1 Mar. 24, 2011

Related U.S. Application Data

(63) Continuation of application No. 10/585,400, filed as application No. PCT/FR2004/002970 on Nov. 22, 2004, now abandoned.

(30) Foreign Application Priority Data

Jan. 8, 2004 (FR) ...................... 04 00110

(51) Int. Cl.
*B05C 13/00* (2006.01)
*B05C 3/09* (2006.01)

(52) U.S. Cl.
CPC .. *B05C 13/00* (2013.01); *B05C 3/09* (2013.01)

(58) Field of Classification Search
CPC .................................. B05C 13/00; B05C 3/09
See application file for complete search history.

(56) References Cited

U.S. PATENT DOCUMENTS

| | | | |
|---|---|---|---|
| 5,149,158 A | 9/1992 | Molinaro et al. | |
| 5,857,576 A | 1/1999 | Kim et al. | |
| 2005/0254148 A1* | 11/2005 | Shimizu | 359/819 |

FOREIGN PATENT DOCUMENTS

| | | | |
|---|---|---|---|
| DE | 17 28 469 U | 8/1956 | |
| FR | 1 121 357 A | 8/1956 | |
| GB | 1 361 113 A | 7/1974 | |
| JP | 2001-311914 A * | 9/2001 | G02C 7/02 |
| JP | 2001 311914 A | 11/2001 | |

OTHER PUBLICATIONS

Machine Translation, JP 2001-311914 A.*

* cited by examiner

*Primary Examiner* — David Turocy
*Assistant Examiner* — Michael G Miller
(74) *Attorney, Agent, or Firm* — Young & Thompson

(57) ABSTRACT

Method for dip treatment of an optical element, wherein the optical element is held, while it is being dipped, by a holding ring, the ring including a hoop for draining and encircling a peripheral edge of the optical element, thereby exerting continuous linear contact with the peripheral edge, the hoop forming an arc over more than 180° and being provided at each of its two ends with an outwardly-directed drip tab pointing away from the optical element.

14 Claims, 2 Drawing Sheets

METHOD FOR HOLDING A LENS FOR DIP TREATMENT THEREOF

CROSS REFERENCE TO RELATED APPLICATIONS

This application is a continuation of co-pending application Ser. No. 10/585,400 filed on Jul. 7, 2006, which is the 35 U.S.C. §371 national stage of International PCT/FR04/02970 filed on Nov. 22, 2004, which claims priority to French Application No. 0400110 filed on Jan. 8, 2004. The entire contents of each of the above-identified applications are hereby incorporated by reference.

TECHNICAL FIELD TO WHICH THE INVENTION RELATES

The present invention relates in general to fabricating optical elements of organic material such as ophthalmic lenses for correction purposes and/or for sunglasses, and also lenses for instruments or optical precision instruments. The invention relates more precisely to treating the surface of such an element by depositing a coating layer by dipping the element in a bath of liquid, and it relates to using a ring as an interface for holding the element for dipping purposes.

TECHNOLOGICAL BACKGROUND

In order to fabricate a lens, in particular an ophthalmic lens, it is conventional to form a transparent substrate by molding, thermoforming, and/or machining a synthetic resin or a mineral glass, and subsequently to deposit one or more coating layers imparting various optical or mechanical properties to the lens such as an ability to withstand impacts or abrasion, attenuating reflections, photochromy, etc. Thus, typically, the following are deposited in succession on at least one of the faces of an ophthalmic lens: a so-called primer layer; a hard layer providing resistance to abrasion; and finally an optional anti-reflection layer. The primer layer favors bonding of the hard layer and generally reinforces impact resistance. Primer layers and hard layers are generally constituted by varnish.

In industrial processes for fabricating lenses, and in particular ophthalmic lenses, these varnish layers are deposited by centrifuging or dipping in a bath of solution or by dispersing the varnish on the corresponding face of the substrate. When making use of dipping, the most inexpensive method, tooling is used that serves to hold the lens while it is being manipulated and in particular while it is immersed in the treatment bath. Such holding tooling typically consists in an individual clamp having three branches engaging each lens on its edge face in three point or linear contact zones of its periphery, comprising two lateral contact zones and one bottom contact zone. In order to treat as many lenses as possible, the tooling may also consist in a "basket" capable of receiving a plurality of lenses simultaneously, and giving each of them the three above-mentioned bearing zones.

It is found that use of such tooling generates defects on the lens, which defects consist in the appearance of running and/or meniscuses of solidified varnish. Such meniscuses, in particular, consist in zones where the deposited material is too thick and they occur at the periphery at the points of contact between the lens and the tooling, penetrating radially several millimeters towards the center of the lens, thereby affecting the working portion thereof. These zones of extra thickness harm the quality of the coating, and more generally they harm the appearance and even the optical functions of the lens. Such local zones of extra thickness are particularly undesirable when depositing a thin layer that is to present uniform thickness, as applies in particular for so-called "quarter-wave" layers seeking to reduce the intensity of the optical phenomenon of interference fringes appearing at the interface between the substrate and the coating layer, and associated with them having different refractive indices.

BRIEF SUMMARY OF THE INVENTION

The main object of the present invention is to provide a method for dip treatment of an optical element, enabling a coating layer to be deposited on a lens by dipping, which layer is uniform in thickness and in particular is free from any peripheral zones of extra thickness.

A secondary object of the present invention is to ensure that the method as proposed in this way can be used with existing clamping type or basket type tooling without requiring the tooling to be adapted.

To solve this problem, the invention provides a method for dip treatment of an optical element, wherein said optical element is held, while it is being dipped, by a holding ring, the ring comprising a hoop for draining and encircling a peripheral edge of the optical element, thereby exerting continuous linear contact with said peripheral edge, said hoop forming an arc over more than 180° and being provided at each of its two ends with an outwardly-directed drip tab pointing away from the optical element.

The Applicant has designed and tested various contact shapes between the holding tooling and the lens. From that work, it can be seen that once contact generally in the form of a point exists between at the edge of the lens, then a running or extra thickness defect appears, in particular a defect of the meniscus type. That is why the proposed solution seeks to avoid the operation of dipping a contact of that type. In the method according to the invention, the holding ring acts during said operation as a holding interface interposed between the lens for treatment and the tooling that serves to handle it. Because of its encircling hoop, the ring is clipped onto the lens for treatment by embracing the periphery of the lens and thus exerting continuous linear contact on said periphery. Since the ring is oriented in such a manner that the two drip tabs point downwards, symmetrically about a vertical midplane, the liquid coating material that is deposited during dipping runs over the faces of the lens, and at the periphery it runs along the encircling and draining hoop of the ring. The still-liquid vanish is then drained in channeled manner merely under the effect of gravity. At the two ends of the hoop, by pointing away from the lens, the drip tabs act to dispose of surface material flowing along the hoop, thus avoiding any accumulation of an extra thickness of material in contact with the lens.

It should also be observed that the method according to the invention is particularly convenient since it suffices to engage the ring on the edge of the lens by taking advantage of its opening and its own resilience so that it clamps like a bicycle clip for holding the trousers. The ring can then be gripped and manipulated together with the lens for treatment that it surrounds, in any manner and with any tooling, while avoiding any direct contact between the holding tooling and the lens. It is also of interest to emphasize at this point that, in the method according to the invention the holding ring can be used merely in addition to pre-existing conventional holding tooling, thus making it possible to avoid the high cost that would arise if all the tooling currently in service were to be replaced.

According to an advantageous characteristic of the invention, the hoop presents an inside face in contact with the edge of the optical element, which inside face is longitudinally continuous to the second order. In other words, this inside contact face has no sharp edges extending across it, thereby encouraging varnish to flow longitudinally. The drip tabs then preferably present respective inside faces extending said hoop with longitudinal continuity to the second order. Also advantageously, and still to encourage drip drying, the free ends of the drip tabs are chamfered.

According to another advantageous characteristic of the invention, the hoop is made from a second member of section that presents an inside for coming into contact with the lens, an outside, and two lateral sides, at least one of the inside and the outside of the section of the hoop being set back and connecting to the lateral side via sharp angles. This shape facilitates the flow of varnish along the ring and serves in particular to provide a gutter or duct for the flow of liquid between the edge face of the lens and the concave inside face of the hoop.

According to another advantageous characteristic, the encircling hoop presents an outside face possessing two diametrically opposite striated portions making the ring with its lens easier and more reliable to grip by means of a conventional type of clamp.

According to another advantageous characteristic, while it is being dipped, the holding ring is oriented in such a manner that both of its drip tabs point downwards.

DESCRIPTION OF DRAWINGS

Other characteristics and advantages of the invention appear on reading the following description of a particular embodiment, given by way of non-limiting example.

Reference is made to the accompanying drawings, in which.

DETAIL DESCRIPTION OF EMBODIMENTS

Figure 1:
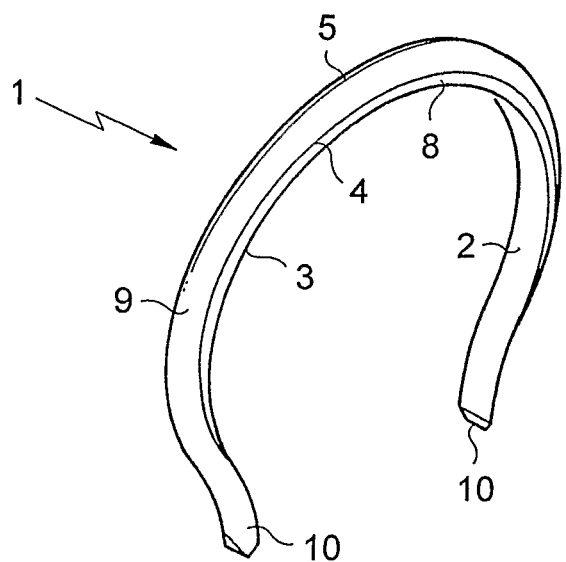
FIG. 1 is a perspective view of a holding ring used in the method according to the invention.

With reference to the figures, and in particular FIG. 1, the holding ring used in the method according to the invention comprises a hoop 1 for encircling around the edge of a lens.

In this example the lens typically consists in an ophthalmic lens having a surface on which it is desired to deposit a layer of varnish, as is explained in greater detail below with reference to FIG. 4.

The encircling hoop 1 is then for clipping around the lens against its edge surface. The hoop 1 does not form a complete circle, but presents an opening via which the ring can be clipped onto the optical element. The hoop 1 thus forms an arc of more than 180°, and preferably lies in the range 250° to 320°. In the particularly-optimized example shown, the hoop forms an arc of 300° with an opening referenced Alpha in FIG. 2 occupying 60°, to within 10%.

To perform this clip encircling engagement, the hoop 1 is made of a material that is elastically flexible. The stiffness of the material used needs to be the result of a compromise so as to ensure that the ring is secured reliably on the lens but without that stressing the lens. In testing, satisfactory results have been obtained with a hoop exerting a holding force on the lens of the order of a few newtons. In testing, with a lens having a diameter of 65 millimeters (mm), the force used has been in the range 3 newtons (N) to 8 N.

The material must also withstand the treatments to which it is going to be subjected together with the lenses on which it is to be fitted, and must remain inert relative to said treatments. In particular, it is necessary to find good mechanical behavior at high temperature without Young's modulus collapsing up to temperatures of about 100° C., and also good chemical resistance to hot basic solutions, alcohol solvents, ketone, etc. It is preferable for the melting temperature of the material to be greater than 150° C. and for its glass transition temperature to be greater than −20° C. By way of example, it is effective to use polyamide 66 as the material constituting the ring, where polyamide 66 has a melting temperature of about 270° C., and a Young's modulus at ambient temperature of 2840 megapascals (MPa), or else to use polypropylene, which has a melting temperature of 180° C., a glass transition temperature of −10° C., and a Young's modulus of 1000 MPa to 1500 MPa at ambient temperature.

The encircling hoop 1 presents an inside face 2 that is to come into contact with the edge of the optical element, i.e. specifically the edge face of the lens. This inside face 2 is longitudinally continuous to the second order. It thus has no sharp edges crossing it, thereby encouraging varnish to flow longitudinally on being extracted from the bath, as is explained in greater detail below.

In contrast, it can be seen that the hoop 1 presents outwardly and on its sides sharp longitudinal edges 3, 4, in the form of circular arcs for the purpose of encouraging and channeling the flow of liquid material and thus improving the quality of drainage that is looked for on leaving the treatment bath.

More precisely, the inside face 2 of the hoop 1 is cylindrical and joins two flat flanks 8 via two edges 3 (only one of which is visible in FIGS. 1 and 2), which flanks join an outside face 9 made in the form of two convex portions, e.g. conical or toroidal portions, united by an edge 5 forming a crest line.

Figure 3:
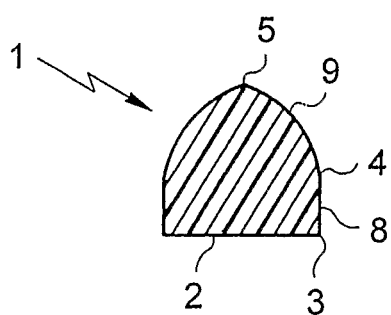
FIG. 3 is a section view on line III-III of FIG. 2.

With reference to FIG. 3, the encircling and draining hoop 1 is thus made from a section member of section presenting an inside corresponding to the inside face 2 that comes into contact with the optical element, and outside in the form of a triangular arch, corresponding to the outside face 9 and presenting an angular apex corresponding to the edge 5, and two lateral sides corresponding to the flanks 8 and connected to the inside and to the outside via pairs of angular points corresponding respectively to the edges 3 and 4. At rest, the neutral line of the hoop 1 presents the general shape of an arc of a circle.

Figure 2:
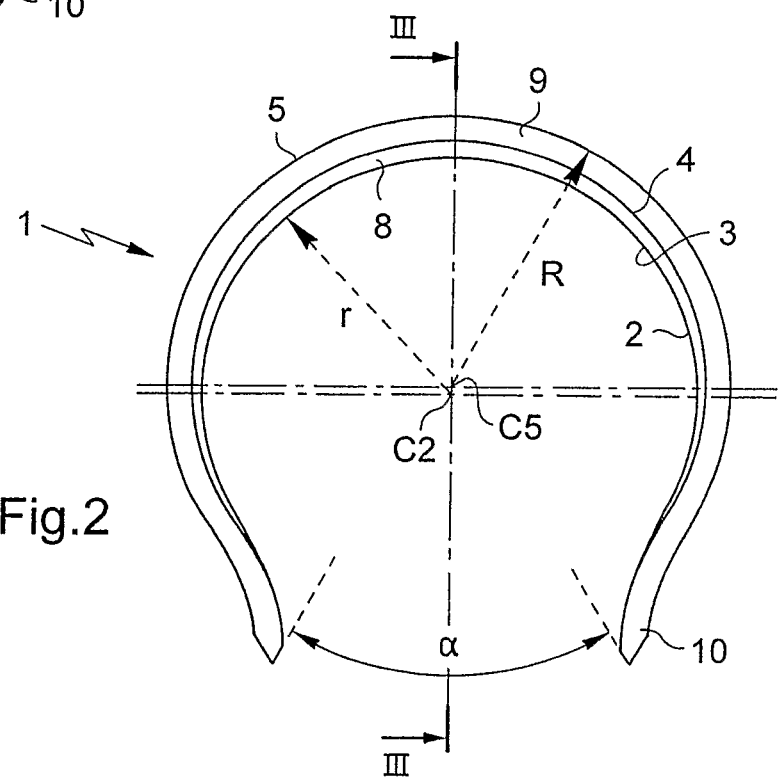
FIG. 2 is a plan view of the FIG. 1 ring.

At rest, the encircling hoop 1 possesses an inside diameter corresponding to the diameter of the inside face referenced r in FIG. 2, and an outside diameter, referenced R, corresponding to the diameter of the apex ridge 5. The center $C_2$ of the ridge 2 is offset downwards a little towards the opening α from the center $C_5$ of the edge 5. Since the edges 4 and 5 are concentric, the edge 3 meets the edge 4 tangentially. Specifically, in order to hold lenses that conventionally have a diameter of 65 mm, the following values have been used: r=28.5 mm and R=32.5 mm.

At each of the two free ends of the encircling hoop 1, the ring is also provided with a respective outwardly-directed drip tab 10.

Each drip tab presents an inside face extending the inside face of the encircling hoop 1 with longitudinal continuity to the second order.

As can be seen more clearly in FIG. 2, the free ends of the drip tabs are chamfered so as to make it easier for drips of material to be removed under gravity. In the example shown, the end chamfers formed in this way leave between them a dihedral presenting an angle at the apex equal to the opening angle α.

Figure 4:
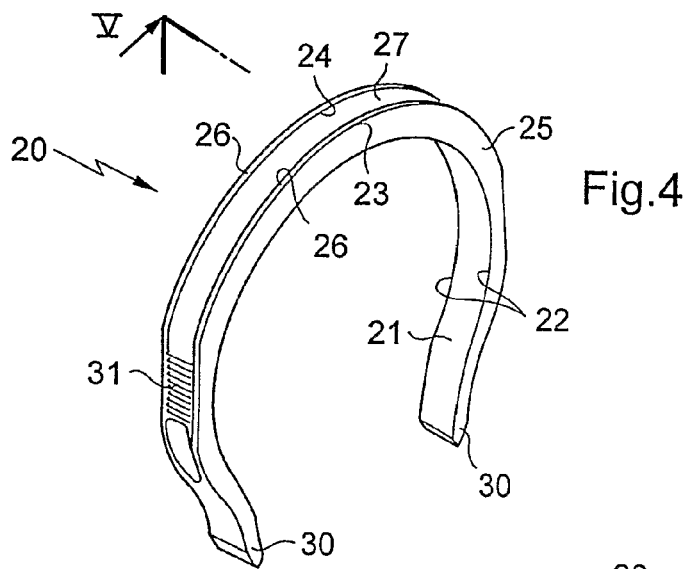
FIG. 4 is a perspective view of a holding ring in a variant embodiment of the invention.
Figure 5:
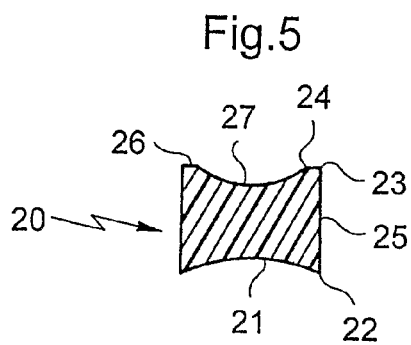
FIG. 5 is a section view on V of FIG. 4.

FIGS. 4 and 5 show a variant embodiment of a ring of the invention. As above, this ring comprises an open hoop 20 provided at its free ends with downwardly-pointing drip tabs 30.

In this variant, the hoop 20 possesses inside and outside faces 21 and 27 that are concave and flanks 25 that are flat. More precisely, and as can be seen more clearly in FIG. 5, the inside of the section of the hoop 20, corresponding to the inside face 21, is in the form of a circularly arcuate setback and joins the lateral sides corresponding to the flank 25 directly via sharp angles. The outside of the section of the hoop 20, corresponding to its outside face 27, has a main central portion in the form of a circularly arcuate setback, and it joins the lateral sides 25 via two flats 26 forming sharp angles 23, 24 with the lateral sides 25 and with the central portion.

The outside face of the encircling hoop possesses two striated holding portions 31 that are diametrically opposite and generally situated on the horizontal diameter of the hoop 20.

Figure 6:
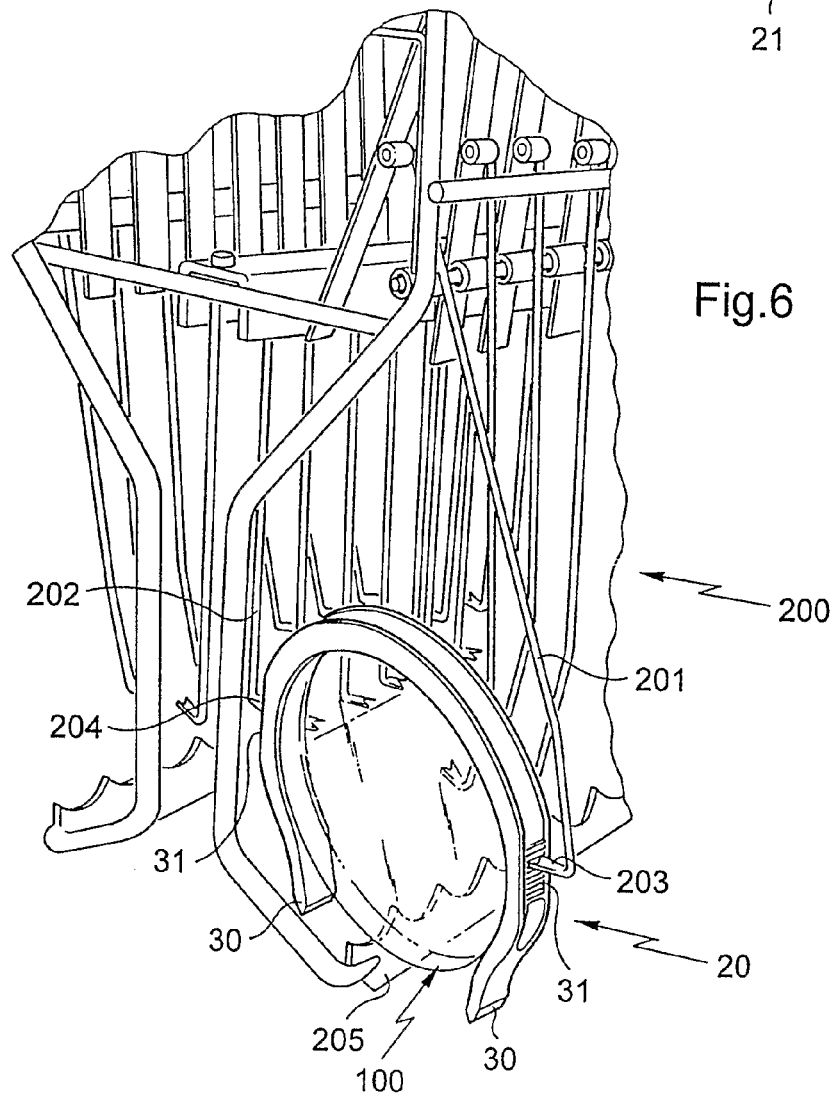
FIG. 6 is a perspective view showing an ophthalmic lens being gripped by means of conventional tooling plus the holding ring of FIG. 4 in order to enable it to be treated by dipping.

In operation, as shown in FIG. 6, tooling is used for holding the lenses 100 while they are being manipulated, and in particular while they are being immersed in the treatment bath. This holding tooling is of conventional type and consists in this example and in typical manner of a basket 200 capable of receiving a plurality of lenses 100 simultaneously and providing each of them with three bearing zones, comprising two lateral grip zones and one bottom bearing zone.

Each lens 100 is previously provided with a holding ring such as the ring 20 described above.

To receive each lens 100, the basket 200 has a clamp with two branches 201, 202 gripping the ring 20 of each lens 100 via its outside face, its striated portions 31 co-operating by providing a grip for angled claws 203, 204 formed at the ends of the clamp branches 201, 202. A plinth 205 provides a direct bearing point for the edge face of the lens 100 in its bottom portion.

What is claimed is:

1. A method for dip treatment of an optical element, comprising:
   dipping said optical element,
   said optical element having a peripheral edge defined by an edge surface located between a front face and a rear face,
   the peripheral edge surface defining, in a first plane located completely between said front and rear faces, an arcuate exterior circumferential perimeter of said optical element,
   wherein while said optical element is being dipped, holding said arcuate exterior circumferential perimeter of said optical element by a holding ring,
   the holding ring comprising a hoop for draining and encircling a peripheral edge of the optical element, said hoop forming an arc over more than 180° and being provided at each of two ends with an outwardly-directed drip tab pointing away from the held optical element, said hoop further comprising a front edge and a rear edge with an inside circumferential face therebetween, the inside face having an inner arcuate circumferential surface that extends from a first of said drip tab to a second of said drip tab, the inner arcuate circumferential surface defining, in a second plane located completely between said front and rear edges, an opening via which the ring is clipped around the optical element by embracing the peripheral edge of said optical element by more than 180° of the inner arcuate circumferential surface of the holding ring forming a single continuous circumferential contact region along more than 180° of said arcuate exterior circumferential perimeter of said optical element, the inner arcuate circumferential surface thereby exerting continuous linear contact with said peripheral edge over the contact region of more than 180° of said arcuate exterior circumferential perimeter of said optical element.

2. The method according to claim 1, wherein the hoop presents the inside face in contact with the peripheral edge of the optical element, said inside face is longitudinally continuous and presents no sharp edge extending across the inside face.

3. The method according to claim 2, wherein each of said drip tab presents an inside face extending the inside face of the hoop with longitudinal continuity, without any sharp edge extending across the inside face.

4. The method according to claim 1, wherein the arc formed by the hoop, in the second plane, is lying in the range 250° to 280°.

5. The method according to claim 4, wherein the hoop forms an arc of 250° to within 10%.

6. The method according to claim 1, wherein the hoop is elastically flexible.

7. The method according to claim 1, wherein the free ends of the drip tabs are chamfered.

8. The method according to claim 1, wherein the hoop is constituted by a section member of section that presents an inside for contacting the optical element, an outside, and two lateral sides, at least one of the inside and the outside of the section of the hoop connecting to the lateral sides via sharp angles.

9. The method according to claim 8, wherein at least one of the inside and the outside of the section of the hoop is concave, thereby forming a setback therein.

10. The method according to claim 1, wherein the encircling arc presents an outside face possessing two diametrically opposite striated holding portions.

11. The method according to claim 1, wherein, while the optical element is being dipped, the holding ring is oriented in such a manner that both of the drip tabs (10; 30) point downwards.

12. The method according to claim 1, wherein the optical element is a lens.

13. The method of claim 1, wherein said dipping step includes gripping said holding ring with a clamp and dipping the clamp, holding ring, and optical element into a basket in order to apply the dip treatment to the optical element.

14. A method for dip treatment of an optical element, comprising:
   embracing more than 180° of a peripheral circumferential edge of said optical element within a holding ring, the optical element being an ophthalmic lens having a surface on which a layer is to be applied, the holding ring comprising an encircling hoop of elastically flexible material,
   the encircling hoop forming less than a complete circle so as to present an inner arcuate surface defining an opening via which the ring can be clipped onto the lens, said encircling hoop forming an arc over more than 180° and being provided at each of two ends of the arc with an outwardly-directed drip tab pointing away from the embraced optical element, said embracing step comprising clipping the encircling hoop around the peripheral circumferential edge surface of the lens so that said inner arcuate surface of said encircling hoop exerts continuous linear contact with said peripheral circumferential edge over more than 180° of a circumference of said lens; and gripping the holding ring with a clamp, while the lens is embraced by the encircling hoop; and dipping the clamp, gripped holding ring, and the lens into a basket to apply the layer to the lens.

* * * * *